Figure 1:
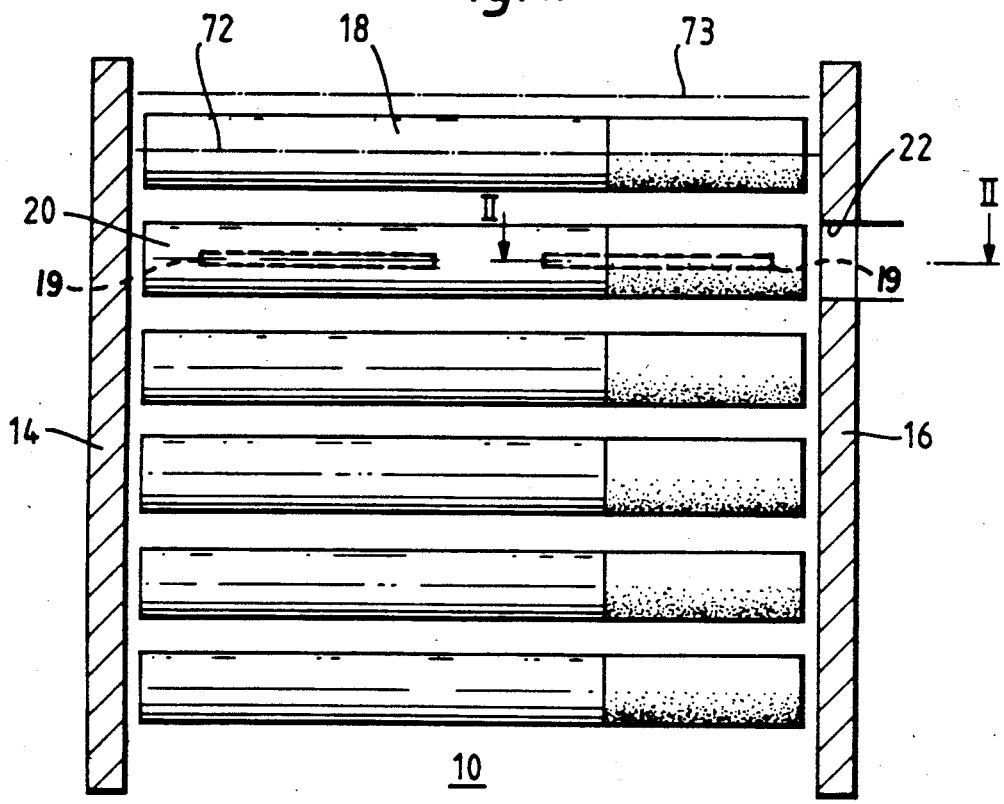

United States Patent [19]

Brink et al.

[11] Patent Number: 5,024,333
[45] Date of Patent: Jun. 18, 1991

[54] CIGARETTE SEGREGATING APPARATUS

[75] Inventors: Andre Brink, Pretoria, South Africa; Michael J. Cahill, Coventry, England; John Dawson, Coventry, England; Juilian W. Gardner, Coventry, England; Alan A. Thierry, Coventry, England

[73] Assignee: Molins PLC, Milton Keynes, England

[21] Appl. No.: 405,261

[22] Filed: Sep. 11, 1989

[30] Foreign Application Priority Data

Sep. 15, 1988 [GB] United Kingdom ............... 8821652.8

[51] Int. Cl.⁵ .......................... B07C 5/34; A24C 5/345
[52] U.S. Cl. .................................... 209/535; 131/907; 209/536; 209/643
[58] Field of Search .................. 209/535–537, 209/643; 131/282, 283, 907, 908; 53/151, 54; 294/64.2; 250/223 R, 572

[56] References Cited

U.S. PATENT DOCUMENTS

| | | | |
|---|---|---|---|
| 3,410,402 | 11/1968 | Gundrum et al. | 209/922 X |
| 4,271,968 | 6/1981 | Mehrkam | 209/581 X |
| 4,323,311 | 4/1982 | West et al. | 250/572 X |
| 4,496,055 | 1/1985 | Green et al. | 209/535 X |
| 4,592,470 | 6/1986 | Mattei et al. | 209/643 X |
| 4,644,150 | 2/1987 | Kuga et al. | 209/536 X |
| 4,667,831 | 5/1987 | Mattei et al. | 209/535 |
| 4,760,853 | 8/1988 | Gamberini | 209/535 X |
| 4,805,641 | 2/1989 | Radzio et al. | 131/905 X |

FOREIGN PATENT DOCUMENTS

| | | | |
|---|---|---|---|
| 3146506 | 6/1983 | Fed. Rep. of Germany | 131/908 |
| 2001839 | 2/1979 | United Kingdom . | |
| 2038282 | 7/1980 | United Kingdom | 294/64.2 |
| 1576004 | 10/1980 | United Kingdom . | |
| 2073576 | 10/1981 | United Kingdom . | |
| 2193314 | 2/1988 | United Kingdom . | |
| 2193701 | 2/1988 | United Kingdom | 131/283 |
| 2202628 | 9/1988 | United Kingdom . | |
| 2228176 | 2/1990 | United Kingdom . | |

Primary Examiner—Donald T. Hajec
Attorney, Agent, or Firm—John C. Smith, Jr.

[57] ABSTRACT

Single cigarette rejection, particularly in a passage (10) between vanes (12) in a cigarette packing machine hopper, is performed by axial ejection of faulty cigarettes using suction generated by exhausting high pressure air adjacent an ejection aperture (22) in an end wall (16) of the passage. A short cylindrical casing (24) is located around the aperture (22) and defines a duct (28) through which the cigarette is ejected. The casing (24) includes an annular pressure chamber (32) and venturi orifice (34) for generating suction in the duct (28).

9 Claims, 4 Drawing Sheets

CIGARETTE SEGREGATING APPARATUS

This invention relates to cigarette segregating apparatus, and particularly to apparatus for segregating faulty cigarettes in cigarette packing machines.

In cigarette packing machines cigarettes are allowed to pass down a plurality of passages (usually seven in number) from the bottom of which they are axially ejected into the required collations (usually groups of twenty).

In order to ensure that the full group or complement of cigarettes is satisfactory, it is known to inspect the cigarettes for end faults at a position upstream of the axial ejection position. However, if any faulty cigarette is detected, it is then conventional to reject the entire group of cigarettes.

This drawback has been recognised for a long time, and in recent years endeavours have been made to establish means for rejecting only those cigarettes which are faulty. Most of these proposals have involved rejecting the faulty cigarettes relatively close to the position at which they are axially ejected, i.e. in the lower portions of the passages. Examples of such proposals are the arrangements described in British patent specifications Nos. 2073576, 2133271 and 2156325. A disadvantage of rejecting cigarettes relatively close to the positions from which they are normally axially removed from the passages is that there is relatively little time for other cigarettes to fall to make up for gaps created by rejected cigarettes, particularly where relatively adjacent cigarettes are rejected.

There have been proposals which may overcome this potential problem. For example, in British patent specification No. 2001839 a packing machine hopper is provided with a separate set of passages in a unit within the reservoir section of the hopper and above the normal passages, the testing and rejection of cigarettes being performed in that unit. This results in a cumbersome and expensive hopper. Similarly, in British patent specification No. 2108818 there is a relatively complex arrangement in which each lower portion of a passage in a cigarette packing machine hopper is connected to two upper portions which feed cigarettes alternately to the lower portion, each upper portion having cigarette testing and rejection means.

In our British patent specification No. 2202628 there is proposed a cigarette segregating apparatus capable of use in a cigarette packing machine and overcoming at least some of the disadvantages found in previously proposed arrangements. To this end the apparatus proposed in said specification is particularly well suited for use at or in the upper or intermediate portions of passages leading downwards in a cigarette packing machine hopper. This has the advantage that cigarettes rejected in such upper portions leave gaps which are more readily filled since they are inherently further from the position at which cigarettes are normally axially ejected from the passage to form the group of cigarettes, and hence more time is allowed for filling of the gaps by following cigarettes. Furthermore, since there will be fewer cigarettes resting on a cigarette to be rejected at an upper portion of the passage as compared with a lower portion of the passage, the friction or resistance to axial rejection of a cigarette to be rejected in the upper portion is inherently less so that the axial rejection hence becomes more reliable. Moreover, since in a cigarette packing machine hopper the passages generally converge so that the vanes separating the passages are thicker at their upper portions than at their lower portions, mounting of and access to segregating apparatus associated with the upper portions of the passages is easier and/or less complex than with such apparatus associated with the lower portions. The disclosure of said British specification No. 2202628 is hereby incorporated herein in its entirety.

The present invention relates to cigarette segregating apparatus having similarities with that proposed in said specification No. 2202628, particularly with regard to its suitability for use above the lowermost portions of passages leading downwards in a cigarette packing machine hopper.

According to one aspect of the invention apparatus for segregating faulty cigarettes, particularly in the hopper of a cigarette packing machine, comprises a passage along which cigarettes may pass in a single row in a direction substantially transverse to their lengths, means for testing individual cigarettes during their movement through the passage to identify faulty cigarettes, and means for ejecting faulty cigarettes from the passage, said ejecting means comprising suction means for imparting axial movement to faulty cigarettes. Preferably the suction means comprises means for generating suction by exhausting high pressure air. In a preferred arrangement the ejecting means comprises a duct through which the faulty cigarette is ejected, the duct being associated with a pressure chamber and venturi orifice for generating suction in the duct. The pressure chamber and orifice may be annular and formed in or by the duct wall.

Control of the suction means is preferably achieved by switching of the high pressure air. Activation of the ejecting means may be directly in response to a signal from the testing means or may be made when the faulty cigarette reaches a predetermined position (e.g. that of the ejecting means). Control means responsive to position of cigarettes in the passage for activating at least one of the testing means and the ejecting means may be provided. Preferably the control means includes first means responsive to position of cigarettes for indicating when a cigarette is correctly positioned relative to the testing means, and second means responsive to position of cigarettes for indicating when a faulty cigarette is correctly positioned relative to the ejecting means. Preferably said first and second means of said control means include a common position detector for cigarettes in said passage.

The apparatus of the invention is capable of operation in association with a passage where the positions of cigarettes are not predictable or well-defined. By way of explanation, it should be understood that the lower portions of passages in or associated with hoppers in cigarette packing machines are normally each filled with a single row or column of cigarettes which move downwards through the passages in well-defined stepped motion as cigarettes are axially ejected from the lower end of such passages to form the groups for eventual packing. Above the lower portions of the passages, however, the cigarettes may still be abutting or there may be gaps between them as they fall from the hopper reservoir above and the occupation of such portions of the passages can change unpredictably. Even where there is an abutting column of cigarettes extending up to an upper portion of a passage, the positions of cigarettes at any instant is not well-defined since the build-up of tolerances and/or slightly differing positions of lower cigarettes and/or bounce of cigarettes as the column of cigarettes falls in stepped motion becomes much more significant above the lower portions of the passages. Hence, the provision of means responsive to position of cigarettes in the passage renders the apparatus particularly well suited for use in the upper portions of such passages.

The testing means may be arranged to detect faults in a moving stream of cigarettes passing through the passage. The testing means may detect whether the tobacco end of a cigarette is sufficiently well filled and may, for example, comprise an arrangement substantially similar to that disclosed in British patent specification No. 1576004 or 2193314A. The testing means may include means for compensating for differences in illumination caused by differing axial positions of the ends of monitored cigarettes in such an arrangement.

The testing means may cooperate with a position detector having means for indicating that a cigarette is in a position for monitoring and also means for indicating passage of individual cigarettes. Such a detector may comprise means for directing a beam of radiation diagonally through at least part of the valley formed between abutting parallel cigarettes.

The or a similar position detector may cooperate with the ejecting means so that this responds to a fault signal generated by the testing means to eject the faulty cigarette. Conveniently the testing means and ejecting means may be arranged to be separated by a distance corresponding to a single cigarette diameter so that a common position detector located intermediate said positions can be used for both testing and ejecting.

It will be appreciated that in apparatus in accordance with the invention it is possible to reject two or more successive faulty cigarettes from each passage; the only limitation is believed to be the subsequent possible problem of starvation of a row of cigarettes in a passage resulting from excessive multiple rejections.

In a specific embodiment of a cigarette hopper a cigarette segregating device may be arranged in association with each passage of the hopper, and such devices could be slightly staggered in a vertical direction, in order to accommodate the devices one next to the other.

The suction effect which may be generated by high pressure air to eject a faulty cigarette axially is generally sufficient to be capable of ejecting a cigarette without first arresting its movement, usually downward, in the passage. However, the possibility of using the invention in association with an arresting means either for the faulty cigarette being ejected and/or for adjacent cigarettes (above and/or below the faulty cigarette) is not excluded. Such arresting means may take the form of pressure-induced suction for holding the cigarette or cigarettes against a side wall of the passage, as disclosed in said British patent specification No. 2202628.

Use of high pressure air to generate suction for ejection of cigarettes allows very rapid switching of the suction using relatively small valves in the pressure air supply. The ability to rapidly eject cigarettes in a single operation in an axial direction from positions at which they are normally moving transversely, without having to first arrest the cigarette, is advantageous. Using suction to eject a cigarette has the advantage, as compared with using pressure air to blow a cigarette axially through an opposed aperture, that suction generated in an ejection aperture tends to align the cigarette being ejected with the aperture and does not rely on the position of the other end of the cigarette. By contrast with a method by which cigarettes are ejected by blowing, therefore, if a cigarette becomes misaligned during ejection suction still remains effective. Generation of sufficient suction to eject cigarettes rapidly is easily obtained using air pressures and dimensions of chambers and orifices which are readily achievable.

According to another aspect of the invention apparatus for producing relatively rapid axial movement of a cigarette along a predetermined path comprises means for generating suction on said path ahead of the cigarette by exhausting high pressure air in the vicinity of said path.

Although the apparatus of the invention is particularly suited for use in or associated with a cigarette packing machine hopper, and particularly with the upper portions of passages leading downwards in or from such a hopper, the invention is not limited to use of apparatus in such location. More particularly, the use of apparatus in accordance with the invention in or associated with the lower portions of passages in a cigarette packing machine hopper is not excluded. More generally, segregating or other apparatus according to the present invention may be used with rod-like articles other than cigarettes, e.g. filter rods. Accordingly, it should be understood that the term "cigarette" is used herein for convenience and reference herein to "cigarettes" should be construed as a reference to "cigarettes and similar rod-like articles".

Figure 2:
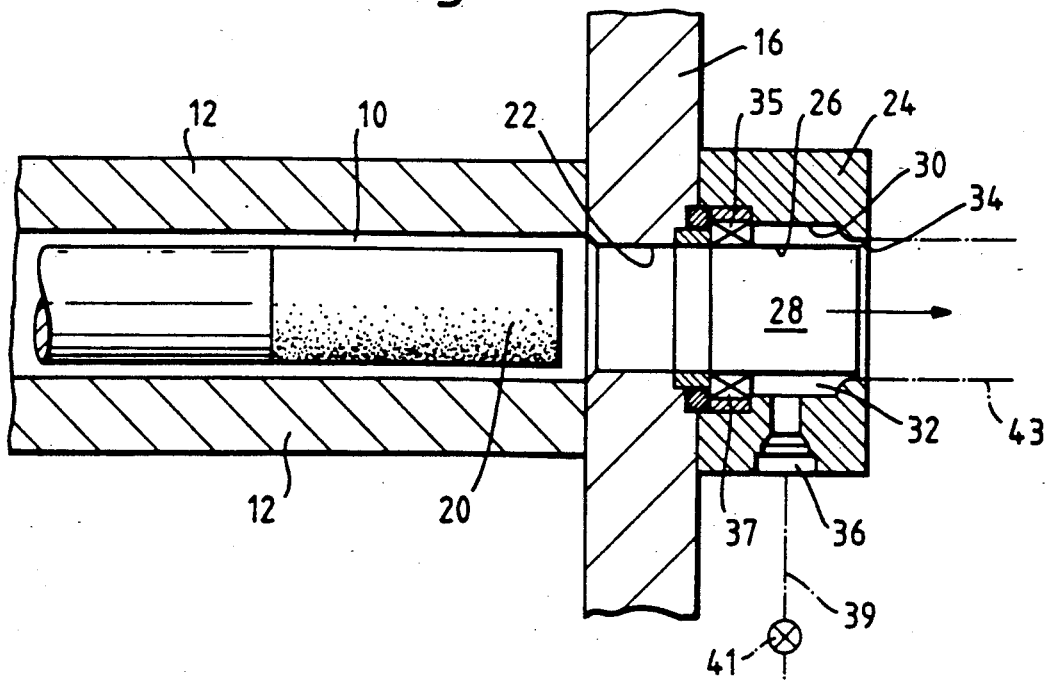
Figure 3:
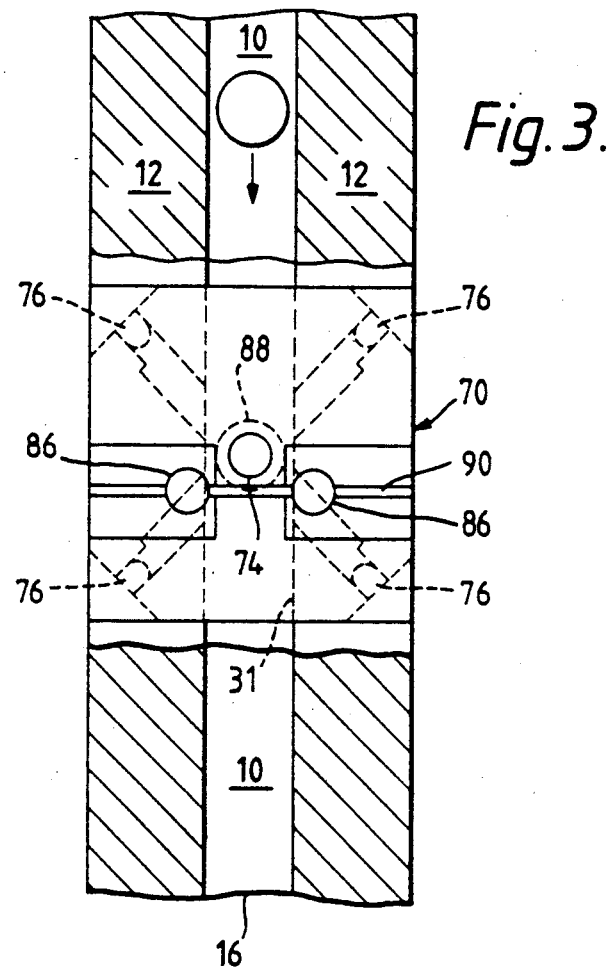
Figure 4:
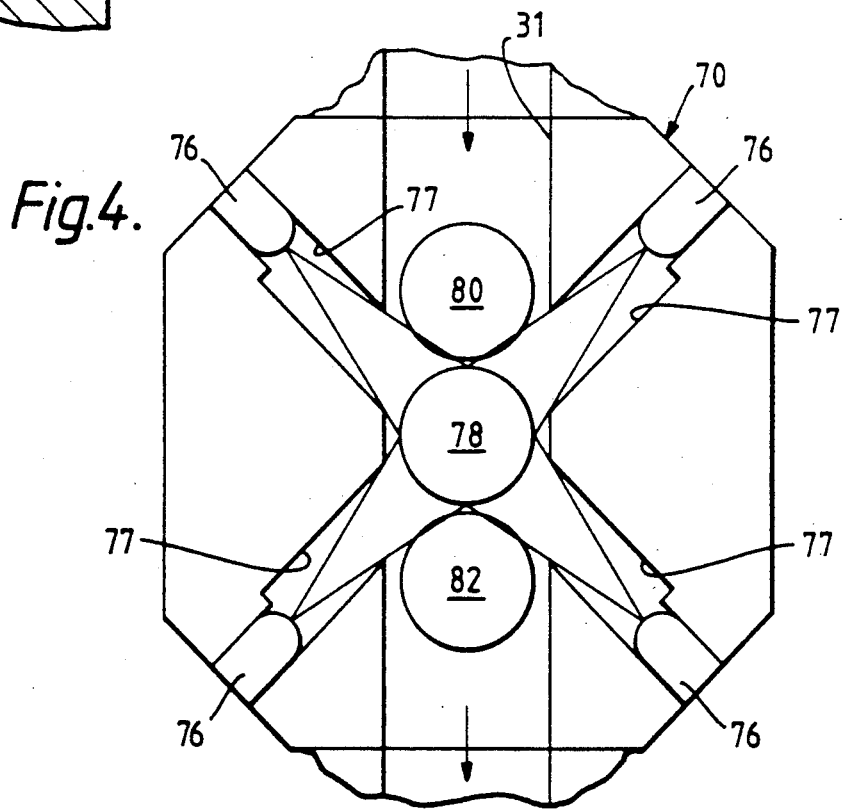
Figure 5:
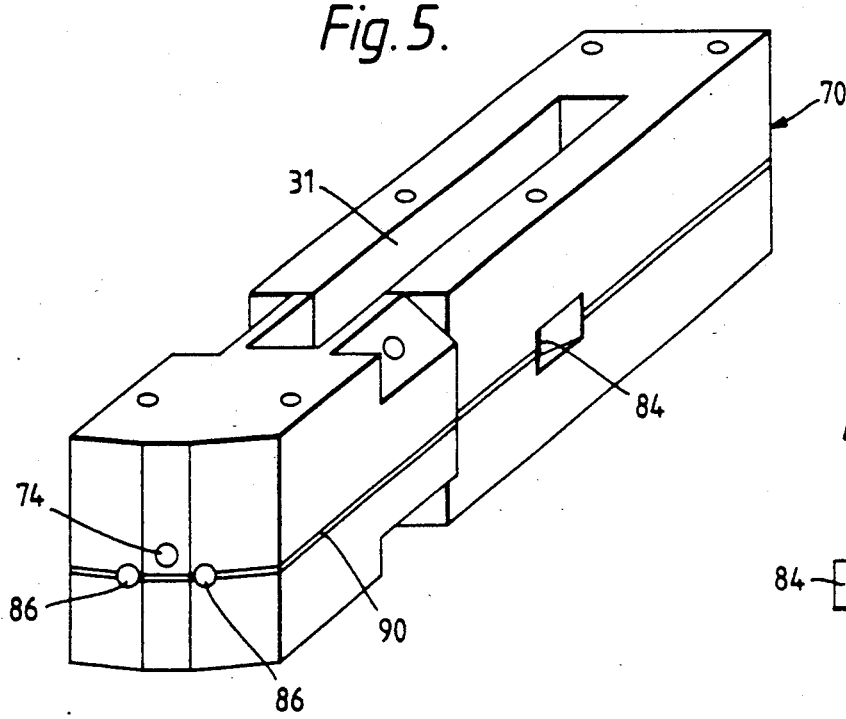
Figure 6:
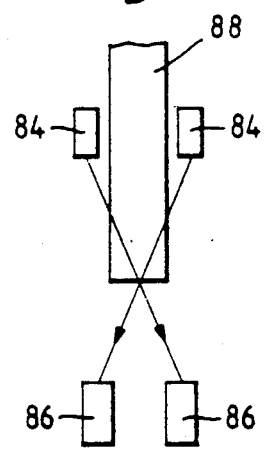
Figure 7:
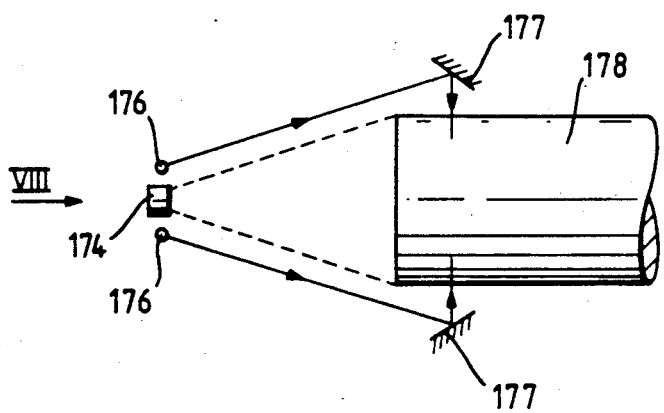
Figure 8:
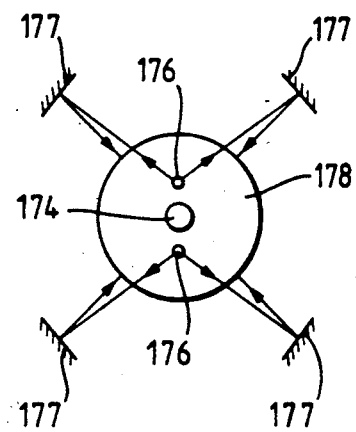
Figure 9:
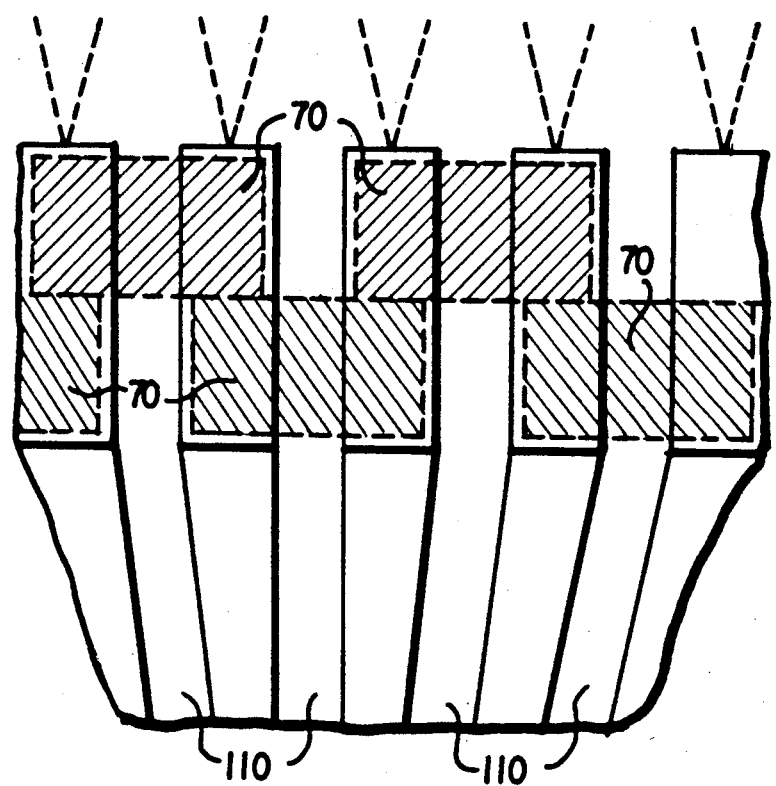

The invention will be further described, by way of example only, with reference to the accompanying diagrammatic drawings, in which:

FIG. 1 is a generally vertical sectional view of part of a hopper in a cigarette packing machine, FIG. 2 is a generally horizontal sectional view on the line II—II in FIG. 1, FIG. 3 is a schematic part-sectional front view of part of a cigarette packing machine hopper including a detector head, FIG. 4 is a view at an enlarged scale of part of the detector head of FIG. 3, FIG. 5 is a perspective view of the detector head of FIG. 3, FIG. 6 is a plan view indicating how part of the detector head of FIG. 3 operates, FIG. 7 is a schematic side view of a modified detector arrangement, FIG. 8 is an end view as seen in the direction of arrow VIII in FIG. 7, and FIG. 9 is a schematic front view of part of a cigarette packer hopper showing the arrangement of adjacent detector heads.

FIGS. 1 and 2 show a passage 10 for descending cigarettes in a cigarette packing machine hopper. The passage 10 is formed between side walls or vanes 12 and end walls 14, 16. Cigarettes descending in the passage 10 are monitored by a detector head (not shown in FIGS. 1 and 2) as they pass the position of cigarette 18. Following detection of a faulty cigarette at 18 the cigarette is subsequently axially ejected through an aperture 22 in the end wall 16 (adjacent the filter end of the cigarette) when it reaches the position of cigarette 20 aligned with the aperture. As shown in FIG. 2 an external ejection duct casing 24 is attached to the end wall 16 surrounding the aperture 22 and an internal coaxial sleeve 26 defines a duct 28 aligned with the aperture 22. The sleeve 26 also defines, with an internal recess 30 in the casing 24, an annular chamber 32 having a narrow annular orifice 34. A radial passage 36 in the casing connects the chamber 32 to a source (not shown) of high pressure air by way of line 39 containing valve 41.

When a cigarette 20 is required to be ejected high pressure air is switched from the source to the chamber 32 using valve 41. The high pressure air exhausting through the narrow orifice 34 creates a low pressure region in the duct 28 which draws the cigarette 20 out through the aperture 22 and duct at high velocity. Typically the diameter of the duct 28 is about 9 mm and the radial width of the annular orifice 34 about 0.5 mm. A typical pressure for the source of high pressure air is 400,000 Pa (58 p.s.i.): lower pressures are still effective but eject the cigarette more slowly.

FIGS. 3-5 illustrate a detector head 70 which monitors the tobacco ends of cigarettes passing down the passage 10. The head 70 is located so that it can monitor a cigarette about one cigarette diameter above the position at which a faulty cigarette is ejected (i.e. cigarettes are monitored approximately along the line 72 in FIG. 1). The head 70 monitors the cigarettes for well-filled ends by shining light (preferably infra-red radiation) substantially axially at the ends of the cigarettes and then detecting from the sides the consequent amount of illumination of the paper wrapper surrounding the ends. In a well-filled cigarette this is less than in a cigarette where the absence of tobacco allows greater illumination of the paper wrapper. The detector head 70 uses a principle substantially similar to that disclosed in British patent specification No. 2193314A. Reference is directed to that specification for details, including those of a suitable control circuit, and its disclosure is hereby incorporated herein in its entirety.

Referring again to FIGS. 3-5, the detector head 70 has a passage 31 and the head is adapted to be mounted with this passage aligned with the passage 10 between vanes 12 so that cigarettes can pass through the passage 31. The head 70 includes a source 74 of infra-red radiation mounted in the end of the head adjacent the end wall 14 and arranged to shine radiation substantially parallel to the descending cigarettes. Four suitable detectors 76 monitor the consequent illumination of the side wrappers of the end portions of the cigarettes.

As shown particularly in FIG. 4, the detectors 76 have acceptance angles so that substantially the entire circumference of a cigarette 78 aligned with the source 74 is monitored. In addition the detectors 76 are recessed in slots 77 which additionally shield the detectors from radiation which may be scattered by neighbouring cigarettes 80, 82.

The axial positions of cigarettes in the passages 10, 31 is not precisely controlled, there being some clearance between the ends of the cigarettes and the end walls 14, 16. As compared with the arrangement of said British patent specification No. 2193314A, where the location of monitored cigarettes is controlled precisely, the shielding by recessing the detectors 76 in slots 77 and selecting detectors with appropriate acceptance angles facilitates use of the method of said specification in the present arrangement where location of cigarettes is less precisely controlled.

A cigarette passing the monitoring position in a recessed position, i.e. with its tobacco end further away from the source 74, will receive less illumination from the source and will also present less of its length for monitoring by the detectors 76. Thus the illumination detected from such a cigarette might be expected to be less than that from a cigarette not so recessed, which might result in a recessed faulty cigarette not being rejected. This effect may be compensated for by selecting and/or arranging the detectors 76 so that they have or are directed so that they have greater sensitivity at positions spaced inwardly from the end of a cigarette located in a mean or normal axial position. Thus, in the case of a cigarette in a position more recessed than this (i.e. further away from the source) the generally lower illumination level is compensated by the fact that the end of the cigarette (the surrounding paper wrapper of which receives more light than other parts of the paper wrapper spaced further from the end) is located at a position of greater sensitivity of the detectors 76. In this way the monitoring arrangement can be made to give sufficiently accurate (i.e. consistent) results over a sufficient range (a few millimeters) of possible axial positions of the ends of cigarettes.

Since cigarettes are moving downwards through the passage 31 such that the position occupied by a cigarette at any instant is unpredictable, and it is required to monitor cigarettes individually when they are aligned with the source 74, a position detector is provided to allow switching of the source 74 and/or control circuit connected to detectors 76. The position detector comprises a pair of infra-red or other radiation emitters 84 (only one of which is shown in FIG. 5) and a pair of detectors 86. The emitters 84 each direct a beam of radiation diagonally across the path of the cigarettes so that the detectors 86 receive radiation only when the intersection between abutting or adjacent cigarettes is passing the beams, the latter being obscured by the ends of the cigarettes at other times. The detectors 86 will therefore receive pulses of light corresponding to the gaps between cigarettes. The trailing edge of a pulse of light will correspond to a cigarette reaching the position indicated at 88 in FIG. 3. The principle of operation of the emitters 84 and detectors 86 is shown in FIG. 6.

The positions of the emitters 84 and detectors 86 could be interchanged. In that case a single emitter or source could be used positioned closely adjacent to the intersection of the beams shown in FIG. 6.

As shown in FIGS. 3 and 5, a sheet of Perspex (RTM) 90 or other similar material is sandwiched in the detector head 70 and aligned with the emitters 84 and detectors 86. This assists in directing the beams in the required directions by internal reflection so that loss of intensity is significantly reduced.

It is expected that normally cigarettes passing the detectors 76 will be abutting or nearly abutting but since the control circuit for detectors 76 responds to an edge of a pulse of light received by the detectors it is capable of responding correctly when the size of the gaps between cigarettes is unpredictable.

The position detector comprising emitters 84 and detectors 86 may also be used to control the switching of high pressure air to the chamber 32 to cause ejection of a faulty cigarette detected by the detectors 76. Thus, where the ejection position is located substantially one diameter or cigarette position below the detection position 72 the high pressure air is admitted to the chamber 32 on detection by the detectors 86 that the cigarette previously aligned with the source 74 has passed below the line of the detectors 86. In other words, in this instance the detectors 86 receive pulses of light corresponding to the movement of successive cigarettes and if a fault signal is generated by a cigarette following one pulse then an ejection signal is generated at or following the next pulse, the latter indicating that the faulty cigarette has moved the single cigarette position between the detection and ejection positions. In principle, it is possible for the detection and ejection positions to be spaced apart by more than one diameter but this may create difficulties in ensuring that the correct cigarettes are ejected if a single position detector is used. It would, of course, be possible to provide separate position detectors associated respectively with the monitoring and ejection of cigarettes, together with a circuit including a count memory to ensure that correct cigarettes are ejected. The position detector could be above the detection position, e.g. on the line 73 in FIG. 1, (in which case the leading edge of a light pulse may indicate correct cigarette position).

Where a cigarette packing machine hopper includes a plurality of vanes and corresponding passages, each passage may be provided with a detector head and associated arresting and ejection means. Preferably these are located relatively high up in the passages so that in the event of ejection of several successive cigarettes in any particular passage this does not result in the so-called "vane starvation", i.e. there is sufficient time before transfer at the bottom of the passages for following cigarettes to fall freely through the passage to make up for gaps created by ejection.

FIG. 9 shows how detector heads 70 may be associated with each passage 110 in a hopper by being staggered alternately above and below one another adjacent the upper ends of the passages.

The suction effect created in the duct 28 is sufficient to cause rapid ejection of faulty cigarettes through the aperture 22. There is no necessity for any separate means for arresting the fall of the cigarette in the passage 10 prior to ejection. The relatively high speed of ejection also obviates the need for any means for holding up adjacent cigarettes as has been proposed previously, although this could be achieved if desired, e.g. by means of suction induced by high pressure air to hold up cigarettes in the passage in the manner disclosed in said British patent specification No. 2202628. Thus, for example, slots 19 (as indicated by dotted lines in FIG. 1) could be provided, equivalent to the slots 52, 54 in said specification No. 2202628 for arresting a faulty cigarette in passage 10 prior to ejection through the aperture 22.

The high pressure air used to generate the suction effect to cause ejection could be connected to the chamber 32 for a predetermined (short) period whenever a faulty cigarette is required to be ejected. Alternatively, the air pressure could be maintained until the ejected cigarette reaches a predetermined position (detected by a photosensor for example) indicating successful ejection. In any event it may be desirable to provide an appropriately-positioned photosensor to check that a cigarette has not been only partly ejected. Thus, the casing 24 could carry a suitable source 35 and sensor 37 for directing a beam across the duct 28, as indicated in FIG. 2. A significant advantage of using high pressure air to generate the necessary suction for ejection is that this can be rapidly switched using small valves in the air line.

If required the duct 28 may be connected to a reject tube (as indicated at 43 in FIG. 2) so that the ejected cigarettes may be directed into a suitable container.

In the detector head 70 of FIGS. 3-5 it would be possible to reverse the positions of the emitter and detectors so that there is a single detector 74 and four emitters 76. This would have the advantage of avoiding the need to integrate the results from four detectors and simplifying the wiring in the vanes, since four emitters 76 could be simply wound in series. A further modified arrangement is indicated in FIGS. 7 and 8 where two emitters 176 located adjacent a detector 174 and axially beyond the end of a cigarette 178 being tested cooperate with suitably-directed mirrors 177 located at positions corresponding to the positions of detectors 76 in the detector head of 70. Although the mirrors 177 are shown as flat in the drawing they may have curved surfaces to achieve appropriate illumination of the end of the cigarette 178, having regard to the desired compensation for axial position of the end. Theoretically it would be possible to have a single emitter replacing the emitters 176 but this may make the optics of the system over-sensitive to vibration and difficult to set up. Having multiple emitters rather than detectors has the advantage that there is no need to integrate results from more than one detector but it would be possible to have a single emitter 174 and two detectors 176 similarly cooperating with mirrors 177. By having emitters and detectors axially beyond the paths of the cigarettes through the passages in the hopper, difficulties with wiring are considerably reduced.

We claim:

1. Apparatus for segregating faulty cigarettes comprising a passage along which cigarettes are arranged to pass in a direction substantially transverse to their lengths in a single row, means for testing cigarettes to identify faulty cigarettes to be segregated, and means for ejecting faulty cigarettes from the passage, the ejecting means comprising suction means for initiating axial movement of faulty cigarettes from said passage.

2. Apparatus as claimed in claim 1, wherein the suction means comprises means for generating suction for conveying faulty cigarettes in an axial direction by exhausting air under pressure.

3. Apparatus as claimed in claim 2, wherein the suction means comprises a duct extending substantially parallel with cigarettes in said passage and through which faulty cigarettes are conveyed by said suction.

4. Apparatus as claimed in claim 3, wherein said passage includes an end wall including an aperture communicating with said duct.

5. Apparatus as claimed in claim 4, wherein said duct is defined by a generally cylindrical wall means and includes a venturi orifice for exhausting pressure air therethrough.

6. Apparatus as claimed in claim 5, wherein the venturi orifice is substantially annular and coaxial with said wall means.

7. Apparatus as claimed in claim 5, wherein said wall means defines an internal pressure chamber communicating with said venturi orifice.

8. Apparatus as claimed in claim 1, further including means for indicating when a faulty cigarette has been successfully ejected from said passage.

9. Apparatus as claimed in claim 1, further including a tube for directing ejected faulty cigarettes to a desired location.

10. Apparatus as claimed in claim 1, wherein said suction means comprises means defining a duct extending generally parallel with cigarettes in said passage, and located adjacent an end wall of said passage so that it communicates with an aperture in said wall, said duct defining means including a pressure chamber and venturi orifice whereby suction is generated in said duct by exhausting pressure air.

11. Apparatus as claimed in claim 1, including control means responsive to position of cigarettes in the passage for activating at least one of the testing means and the ejecting means.

12. Apparatus as claimed in claim 11, wherein the control means includes first means for detecting the presence of cigarettes at a first position in said passage for indicating when a cigarette is correctly positioned relative to the testing means, and second means for detecting the presence of cigarettes at a second position in said passage for indicating when a faulty cigarette is correctly positioned relative to the ejecting means, said second position being spaced from said first position.

13. Apparatus as claimed in claim 12, wherein said first and second means of said control means include a common position detector for cigarettes in said passage.

14. Apparatus as claimed in claim 11, wherein said testing means and ejecting means are arranged to operate at substantially adjacent cigarette positions in said passage.

15. Apparatus as claimed in claim 11, wherein said control means comprises an optical position detector including means for directing a beam of radiation along a path inclined to the longitudinal axes of cigarettes in said passage such that it is interrupted by each successive cigarette passing through said passage and passes through at least part of the valley formed between substantially abutting cigarettes in said passage.

16. Apparatus as claimed in claim 11, wherein said control means comprises optical position detector means including sheet-like translucent means for directing radiation along a preferred path.

17. Apparatus as claimed in claim 1, wherein the ejecting means includes means for arresting a moving faulty cigarette in the passage prior to operation of said suction means.

18. Apparatus as claimed in claim 1, including a plurality of adjacent passages each having an inlet end and associated testing means and ejecting means, the respective distances of the testing means and ejecting means from the inlet end of each passage being different from the respective distances of the testing means and ejecting means from the inlet ends of adjacent passages such that said testing means and ejecting means are in staggered positions in adjacent passages in relation to the lengths of the passages, so as to more readily accommodate said testing means and ejecting means in adjacent passages.

19. Apparatus as claimed in claim 1, wherein said suction means is activated by operation of a valve in a pressurized air supply line.

20. Apparatus for segregating cigarettes comprising means defining a path along which cigarettes are arranged to pass in a direction substantially transverse to their lengths in a single row, and means for removing selected cigarettes from said path, said removing means comprising suction means for initiating and continuing axial movement of said selected cigarettes from said path, said suction means comprising means for generating suction by exhausting air under pressure.

21. Apparatus as claimed in claim 20, further comprising means for testing cigarettes to identify said selected cigarettes to be segregated.

22. An extraction device for the removal of single cigarettes sensed to be substandard from a plurality of cigarettes amassed parallel one with another and with their opposite ends occupying two mutually parallel planes, operating in conjunction with sensing means by which to verify the integrity of the cigarettes, characterized in that it comprises:

an extraction duct supported for alignment with a cigarette, said duct having inlet and outlet end;

a nozzle, discharging into the extraction duct intermediate said inlet and outlet ends in the direction opposite to that of the inlet end, and towards said outlet end, said nozzle constituting part of a pneumatic circuit which further comprises a source of compressed air, and valve means located between the source and the nozzle and interlocked to the sensing means, in such a way that the valve means are operated to open by the sensing means on discovery of a substandard cigarette, connecting the nozzle with the source of compressed air and bringing about the removal of the cigarette by way of the extraction duct, the substandard cigarette being expelled through said outlet end of the duct.

23. An extraction device as in claim 22, wherein the part of the duct into which the nozzle discharges affords a clear passage of internal section not less than the cross section of one cigarette.

24. An extraction device as in claim 22, wherein the nozzle is tubular in embodiment and coincides with a part of the duct.

25. An extraction device as in claim 22, wherein the nozzle is located internally of the duct, near to the inlet end.

* * * * *